United States Patent [19]

Tanabe

[11] Patent Number: 4,712,131
[45] Date of Patent: Dec. 8, 1987

[54] SYNC APPARATUS FOR IMAGE MULTIPLEX TRANSMISSION SYSTEM

[75] Inventor: Toshiyuki Tanabe, Ageo, Japan

[73] Assignee: Kabushiki Kaisha Toshiba, Kawasaki, Japan

[21] Appl. No.: 886,553

[22] Filed: Jul. 17, 1986

[30] Foreign Application Priority Data

Jul. 19, 1985 [JP] Japan .................................. 60-159341

[51] Int. Cl.⁴ ........................ H04N 7/08; H04N 7/087; H04N 7/093
[52] U.S. Cl. ..................................... 358/142; 358/146; 358/147; 375/110; 375/118; 371/42; 370/100
[58] Field of Search ............... 358/142, 146, 147, 148; 370/100; 375/106, 110, 118; 371/42

[56] References Cited

U.S. PATENT DOCUMENTS 4,202,012  5/1980  Hirashima ........................... 358/147
4,626,913  12/1986  Gurumurthy ....................... 358/142
4,672,639  6/1987  Tanabe et al. ......................... 328/75

Primary Examiner—James J. Groody
Assistant Examiner—Michael D. Parker
Attorney, Agent, or Firm—Cushman, Darby & Cushman

[57] ABSTRACT

A sync apparatus for an image multiplex transmission system includes a first means for determining a fetch phase of each teletext signal packet, and a second means for re-determining the fetch phase when the actual phase of the teletext signal packet satisfies a predetermined condition. In this sync apparatus, when synchronization of the teletext signal packets has discontinuity, the first means determines the packet fetch phase, and when it has continuity, the second means determines the packet fetch phase.

11 Claims, 7 Drawing Figures

F I G. 6
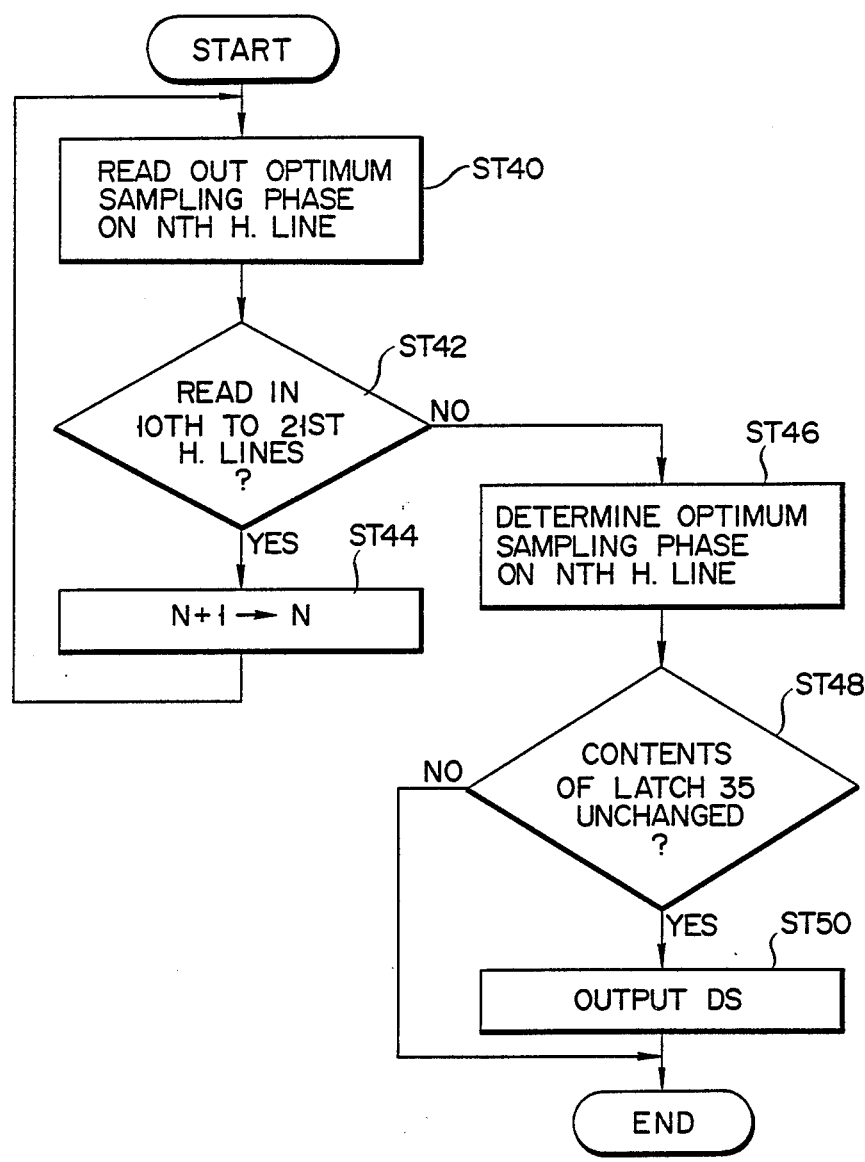

SYNC APPARATUS FOR IMAGE MULTIPLEX TRANSMISSION SYSTEM

BACKGROUND OF THE INVENTION

The present invention relates to an improvement of a sync apparatus used for an image multiplex transmission system, such as a teletext system.

In a teletext system, teletext data is transmitted to be superimposed in one predetermined horizontal scanning period of a television broadcast signal. The teletext data superimposed on the television broadcast signal is a so-called teletext signal packet. In the data format of this packet, a clock run-in signal for synchronizing bit units is followed by a framing code for synchronizing byte units and a data portion including various control and teletext data.

Processing for fetching teletext data included in the teletext signal packet from the television broadcast signal on the reception side will be summarized below. First, the teletext signal packet is separated from the television broadcast signal. Next, a sampling pulse synchronous with the clock run-in signal is formed. Finally, the phase of the framing code is detected from data obtained by the sampling pulse, and the data portion is fetched in accordance with the detected phase.

When a series of data-processings starting with separation and sampling of the teletext signal packet, and ending with the storage of the data portion in a buffer memory, is regarded as the fetching of teletext data, the sampling phase and the detected phase of the framing code can be regarded as fetch phases.

A method of determining the fetch phases on the reception side can be largely divided into two methods. In one method, fetch phases are determined for each teletext signal packet (to be referred to as a first method hereinafter).

In the other method, a fetch phase is predetermined in advance. When the actual phase of the teletext signal packet (i.e., the actual phases of the clock run-in signal and the framing code) satisfies a predetermined condition, the fetch phase is re-determined (to be referred to as a second method hereinafter). More specifically, in the second method, when incoincidence between the packet phase and the predetermined fetch phase is successively found a predetermined number of times (M times), a pull-in operation for matching the fetch phase with the packet phase is started. During the pull-in operation, when coincidence between the two phases is successively found a predetermined number of times (N times), the pull-in operation is stopped, and the fetch phase is fixed.

The first method is effective when synchronization of the teletext signal packet has no continuity. Conversely, when synchronization of the teletext signal packet has continuity, the second method can provide a very stable fetch phase. Note that the synchronization continuity of the teletext signal packet means that horizontal and vertical periodicity of the teletext signal packet is stable. In other words, intervals between adjacent superimposed positions of the teletext signal packets are constant.

The synchronization continuity of the teletext signal packets is obtained by driving the teletext signal packets with a sync signal (e.g., a color burst signal). Therefore, since a television signal does not include a color burst signal in black-and-white broadcasting, the teletext signal packets have no synchronization continuity.

In other words, the teletext signal packet is driven by a synchronous portion (e.g., a color burst signal) of a video signal and is superimposed on the video signal. Therefore, when the synchronization of the video signal exhibits discontinuity, the synchronization continuity of the teletext signal packets can no longer be accomplished. In other words, the synchronization continuity of the teletext signal packets is established only when that of the video signal is accomplished.

The necessity of the synchronization continuity will be summarized below.

Reception of the framing code in the teletext system is very important for the entire reception systems in the reproduction of the clock run-in signal, and bit errors in the reception of the framing code are to be as small as possible.

Although the framing code has an error correction function of 1 bit per byte (8 bits), this correction function is insufficient. However, this function can be assisted by flywheel effective reception. In the flywheel effective reception, once a framing code is received by the reception side to synchronize byte units, data is fetched using a framing code of a self-oscillator unless framing errors successively occur. When framing errors successively occur, byte units are re-synchronized using the input framing code (corresponding to the second method).

The function of the framing code can be enhanced by the flywheel effective reception. However, for this purpose, the synchronization continuity of the teletext signal packets (e.g., clock phases, framing code phases between transmission data lines) must be guaranteed. More specifically, after byte units are synchronized by the preceding protective reception, the data is fetched using the framing code of the self-oscillator on the reception side. Therefore, the synchronization continuity of the teletext signal packets is necessary.

To obtain a flywheel effect for bit synchronization also, the synchronization continuity of the teletext signal is indispensable, as in the case of said byte (or packet) synchronization.

A conventional teletext reception apparatus adopts one of the above two methods as a method of determining a fetch phase. As a result, in an apparatus adopting the first method, fetch errors easily occur during color broadcasting having the synchronization continuity when compared with the apparatus adopting the second method. This is because the first method is easily influenced by a noise signal superimposed on the clock run-in signal or the framing code. In the apparatus adopting the second method, since the fetch phase and the packet phase are easily shifted during black-and-white broadcasting with no synchronization continuity, fetch errors of teletext data easily occur when compared with the apparatus adopting the first method.

SUMMARY OF THE INVENTION

The present invention has been made in consideration of the above situation and has as its object to provide a sync apparatus for an image multiplex transmission system which can eliminate data fetch errors regardless of the presence/absence of synchronization continutity of image data (e.g., a teletext signal packet).

In order to achieve the above object of the present invention, two fetch phase determining means based on the previously mentioned two methods are provided, and the fetch phases determined by the two means are alternatively selected in accordance with the presence/absence of the synchronization continuity.

BRIEF DESCRIPTION OF THE DRAWINGS

FIG. 6 is a flow chart when the presence/absence of bit synchronization continuity is discriminated by the arrangement shown in FIG. 3.

DETAILED DESCRIPTION OF THE PREFERRED EMBODIMENT

An embodiment of the present invention will now be described with reference to the accompanying drawings. In the following description, the terms "byte synchronization", "frame synchronization" and "packet synchronization" have the same meaning.

Figure 1:
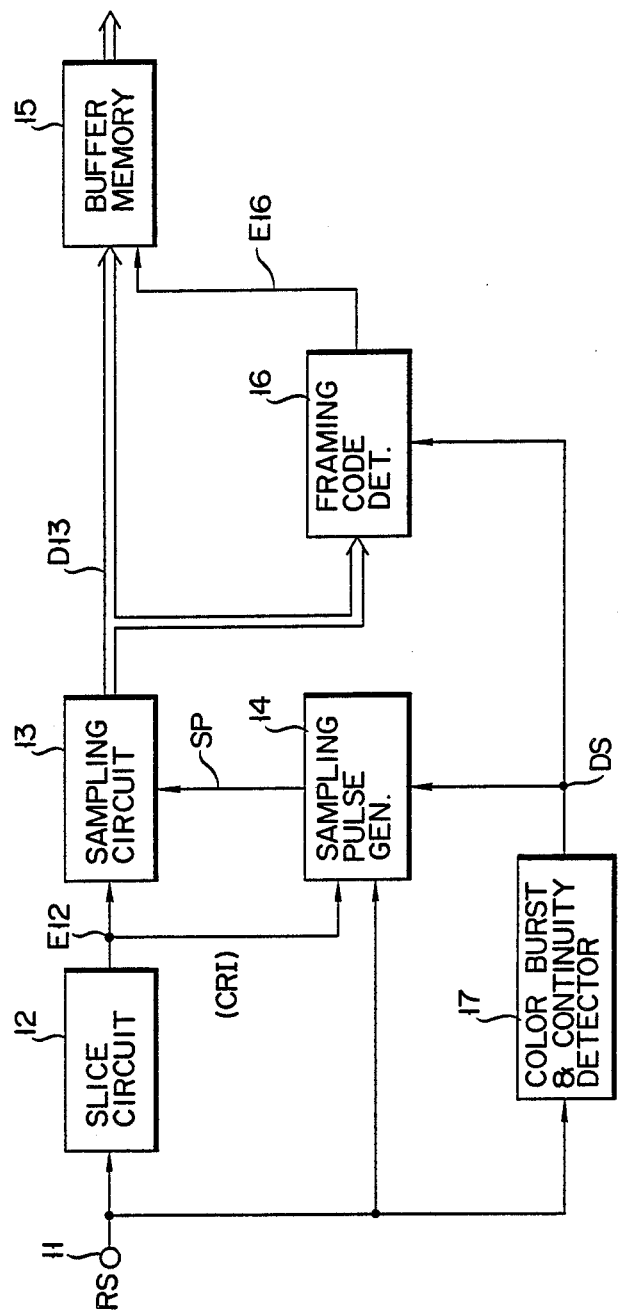
FIG. 1 is a block diagram of an arrangement according to embodiment of the present invention.

FIG. 1 is a block diagram of an arrangement of a sync apparatus according to the embodiment of the present invention. Referring to FIG. 1, received television broadcast signal RS is supplied to terminal 11. Television broadcast signal RS is supplied to slice circuit 12 which separates a teletext signal packet included in signal RS. Signal RS is then waveshaped. Output E12 from slice circuit 12 is supplied to sampling circuit 13. Sampling circuit 13 performs sampling and serial/parallel conversion of input signal E12 in accordance with sampling pulse SP supplied from sampling pulse generator 14. Output D13 from circuit 13 is supplied to buffer memory 15 and framing code detector 16. Framing code detector 16 detects the framing code from output D13 of circuit 13, and enables buffer memory 15 to be based on detected phase E16. Thereby, a data portion of the teletext signal packet is fetched in buffer memory 15.

Sampling pulse generator 14 and framing code detector 16 can determine the sampling phase and the detection phase of the framing code in accordance with either of the two previously mentioned methods. Detection output DS, obtained from color burst signal and teletext signal continuity detector 17, determines which phase should be used. More specifically, when a color burst signal is detected from signal RS by detector 17, and if the continuity of a teletext signal is also detected by detector 17, detector 17 generates output DS, and generator 14 and detector 16 determine the sampling phase and the detection phase of the framing code in accordance with the second method. However, if a color burst signal is not detected, generator 14 and detector 16 determine the two phases in accordance with the first method.

The detailed arrangement of generator 14 and detector 16 will now be described with reference to FIG. 2.

First, the arrangement of generator 14 will be described. In generator 14, burst reproducer 141 reproduces the color burst signal included in signal RS during color broadcasting, that is, reproduces clock CK0 from the signal at frequency fsc (=3.58 MHz) synchronous with the teletext signal packet. Clock CK0 is converted by PLL circuit 142 to reference clock CK1 at frequency (8/5)fsc synchronous with clock CK0. Therefore, during color broadcasting, reference clock CK1, which has a given phase relationship with the teletext signal packet and whose period Tc satisfies the relation 1H=364Tc (where 1H is one horizontal scanning period), can always be obtained from PLL circuit 142.

During black-and-white broadcasting, since signal RS includes no color burst signal, clock CK0 obtained from reproducer 141 is asynchronous with the teletext signal packet, and its frequency is also different from frequency fsc. Thus, reference clock CK1 is also asynchronous with the teletext signal packet, and its period Tc does not satisfy the relation 1H=364Tc.

Reference clock CK1 having characteristics which change in accordance with the broadcast mode (color or monochrome) is input to delay line 143, and is converted to a plurality of pulses having different phases from one another. This pulse string is input to first sampling phase determination circuit 144. Determination circuit 144 compares the phase of clock run-in signal CRI, included in output E12 from circuit 12, with the phases of the pulse string, and determines optimal pulse P1 most suitable for sampling the teletext signal packet. This determination is made each time the teletext signal packet is input to terminal 11. Therefore, sampling phase P1 determined by circuit 144 is a sampling phase determined by the first method.

The determination result from circuit 144 is supplied to second sampling phase determination circuit 145 and data selector 146. Determination circuit 145 determines the sampling phase in accordance with the second method. More specifically, circuit 145 compares sampling phase P2 held therein in advance with sampling phase P1 determined by circuit 144. If incoincidence between phases P1 and P2 is continuously found a predetermined number of times, circuit 144 starts phase pull-in processing in order to lock phase P2 with phase P1 determined by circuit 144. At the same time, circuit 145 enters a monitor mode for monitoring whether or not coincidence between phases P1 and P2 is continuously found a predetermined number of times. When the coincidence between phases P1 and P2 is continuously found the predetermined number of times, circuit 145 interrupts the phase pull-in processing, and enters a monitor mode for monitoring whether or not incoincidence between phases P1 and P2 is continuously found a predetermined number of times.

Second sampling phase determination circuit 145 is operated as described above. With this circuit, the sampling phase can be determined without being influenced by a noise signal superimposed on clock run-in signal CRI.

Data selector 146 selects sampling phase P2 when detector 17 detects the color burst signal and generates output DS. If not detected, selector 146 selects sampling phase P1 determined by circuit 144. Data selector 147 receives the selected phase (P1 or P2) and selects a pulse having a specific phase from the pulse string generated from delay line 143 as sampling pulse SP, in accordance with the received phase data. Selector 147 then supplies pulse SP to sampling circuit 13. Sampling circuit 13 can comprise, e.g., a serial/parallel converter.

Next, the arrangement of framing code detector 16 will be described. Parallel data D13 generated from sampling circuit 13 is supplied to first framing phase determination circuit 161. Determination circuit 161 is driven by sampling pulse SP having the same frequency as that of reference clock CK1, and detects the phase of the framing code included in the teletext signal packet. More specifically, determination circuit 161 holds a framing code, and when parallel data D13 from circuit 13 coincides with the framing code, it generates coincidence pulse E161. Therefore, coincidence pulse E161 indicates the phase of the framing code included in the teletext signal packet. Since this phase detection is made each time the teletext signal packet is received, circuit 161 determines detection phase DP1 of the framing code in accordance with the first method.

The determination output (E161) from circuit 161 is supplied to second framing phase determination circuit 162 and data selector 163. Determination circuit 162 determines detection phase DP2 of the framing code using the same principle as in determination circuit 145.

When detector 17 detects the color burst signal as well as the continuity of the teletext signal, so that signal DS is generated, data selector 163 selects detection phase DP2 from two phases DP1 and DP2 determined as above. However, when the color burst signal and the continuity of the teletext signal are not detected, and no signal DS is generated, selector 163 selects detection phase DP1, and enables buffer memory 15 to be based on selected signal E16 indicating the phase.

Figure 2:
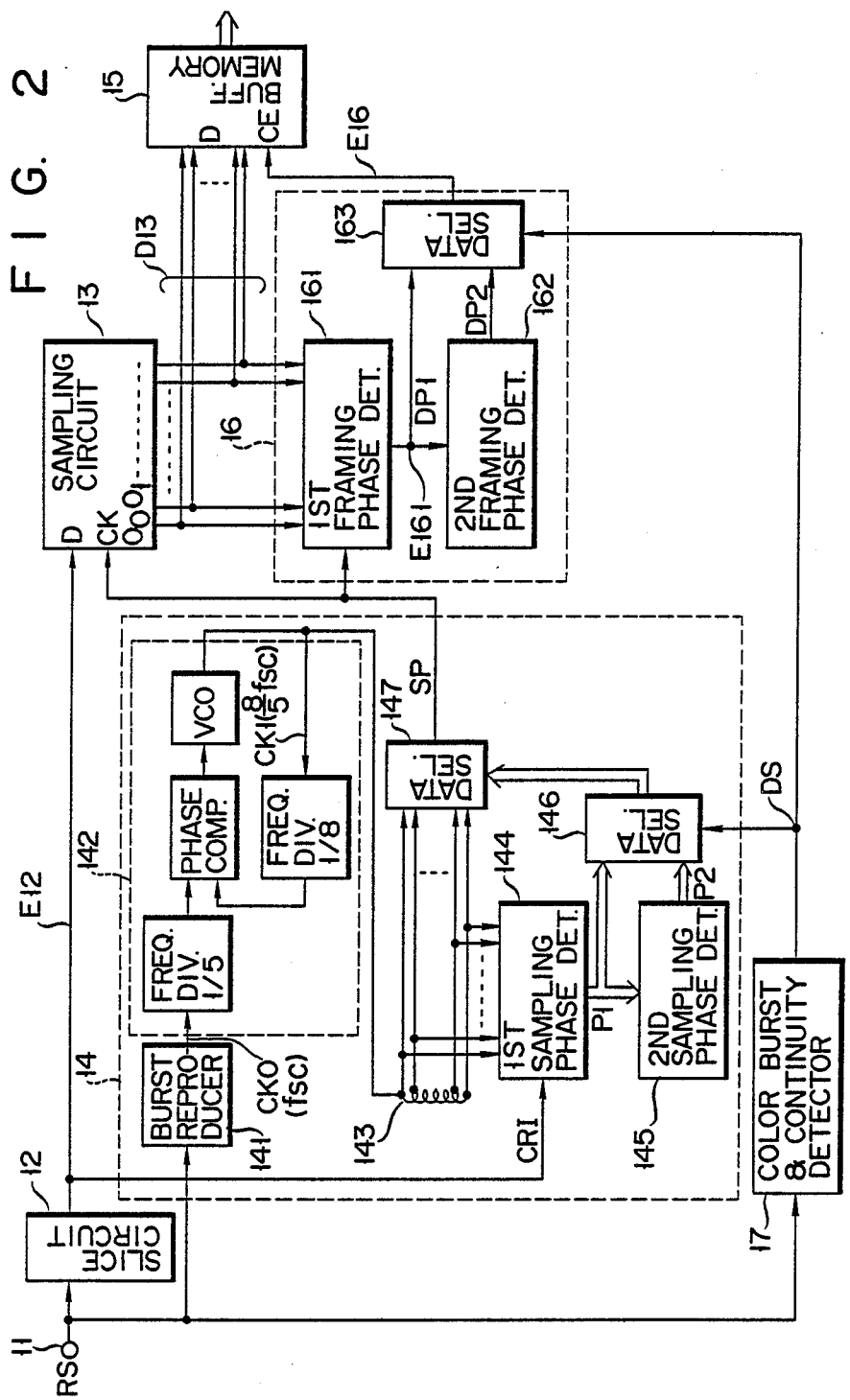
FIG. 2 is a block diagram of a detailed arrangement of FIG. 1.
Figure 3:
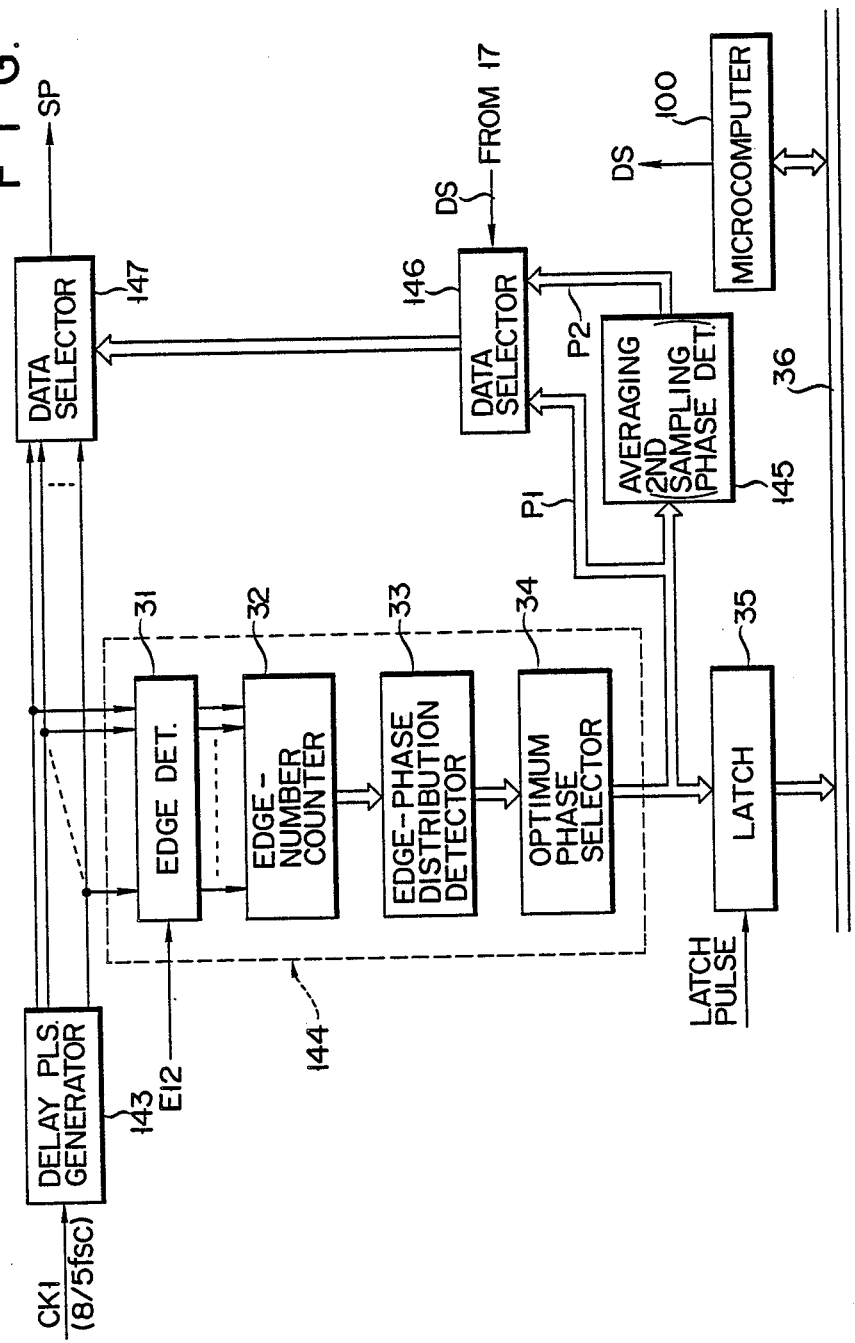
FIG. 3 is a block diagram of an arrangement (143–147) for bit synchronization in the arrangement of FIG. 2.

Circuit components 143 to 147 in FIG. 2 can also be arranged as shown in FIG. 3. In this arrangement, a plurality of pulses having different phases generated from delay pulse generator 143 are input to edge detector 31. The output pulses from detector 31 are input to edge number counter 32. The count of counter 32 is supplied to edge-phase distribution detector 33. Optimum phase selector 34 selects predetermined phase P1 in accordance with the edge phase distribution detected by detector 33. The content of phase P1 is loaded to latch 35.

Signal DS from detector 17 (FIG. 2) is supplied to data selector 146. When signal DS is generated (i.e., bit synchronization is established), selector 146 selects phase P2 from averaging circuit 145 which has a flywheel effect for stabilizing synchronization. This circuit 145 is functionally equivalent to detector 145 in FIG. 2. However, when signal DS is not generated (bit synchronization is not obtained), selector 146 selects phase P1 from optimum phase selector 34.

Circuit components 31 to 34 in FIG. 3 can be those shown in FIG. 8 of U.S. Ser. No. 736,370, now U.S. Pat. No. 4,672,639, filed on May 21, 1985, entitled "SAMPLING CLOCK PULSE GENERATOR" (Inventors: Toshiyuki TANABE & Minoru NOGUCHI). Component 145 in FIG. 3 can be the circuit shown in FIG. 9 of the same patent as above.

All of the disclosed contents of the above U.S. patent are incorporated in this application.

Figure 4:
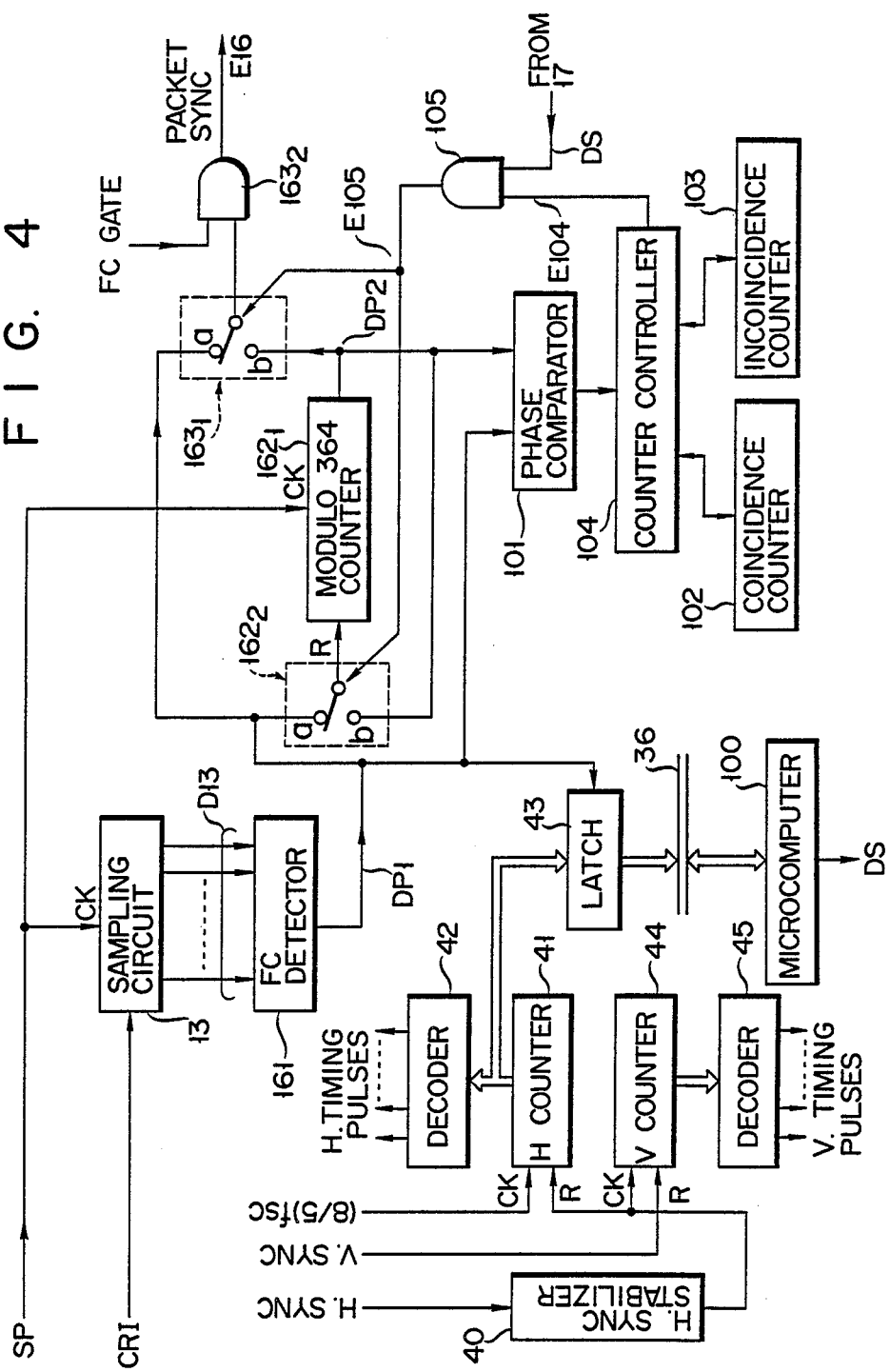
FIG. 4 is a block diagram of an arrangement (161–163) for byte synchronization (frame or packet synchronization) in the arrangement of FIG. 2.

Circuit components 161 to 163 can be arranged as follows. Referring to FIG. 4, sampling circuit 13 samples clock run-in signal CRI in response to sampling pulse SP, and converts it into parallel data D13. FC detector 161 generates framing code detection phase DP1, which is error-corrected based on data D13. Phase DP1 is generated as frame (packet) synchronizing pulse E16 through switch $163_1$ and framing code AND gate $163_2$, and is supplied to data fetch buffer memory 15 in FIG. 2 together with parallel data D13.

Counter $162_1$ is a modulo 364 counter, which counts sampling pulse SP to produce framing detection phase DP2. Either of reproduced phase DP2 or phase DP1 is selected by switch $163_1$, and the selected phase is input to AND gate $163_2$. The frequency of sampling pulse SP is 364 times the horizontal scanning frequency, and counter $162_1$ is periodically operated for one horizontal scanning period as one cycle. The reset input of counter $162_1$ receives phase DP1 or phase DP2 from counter $162_1$ selected by switch $162_2$. This selection is made by counter controller 104 in accordance with the comparison result between phases DP1 and DP2 made by phase comparator 101.

Figure 5:
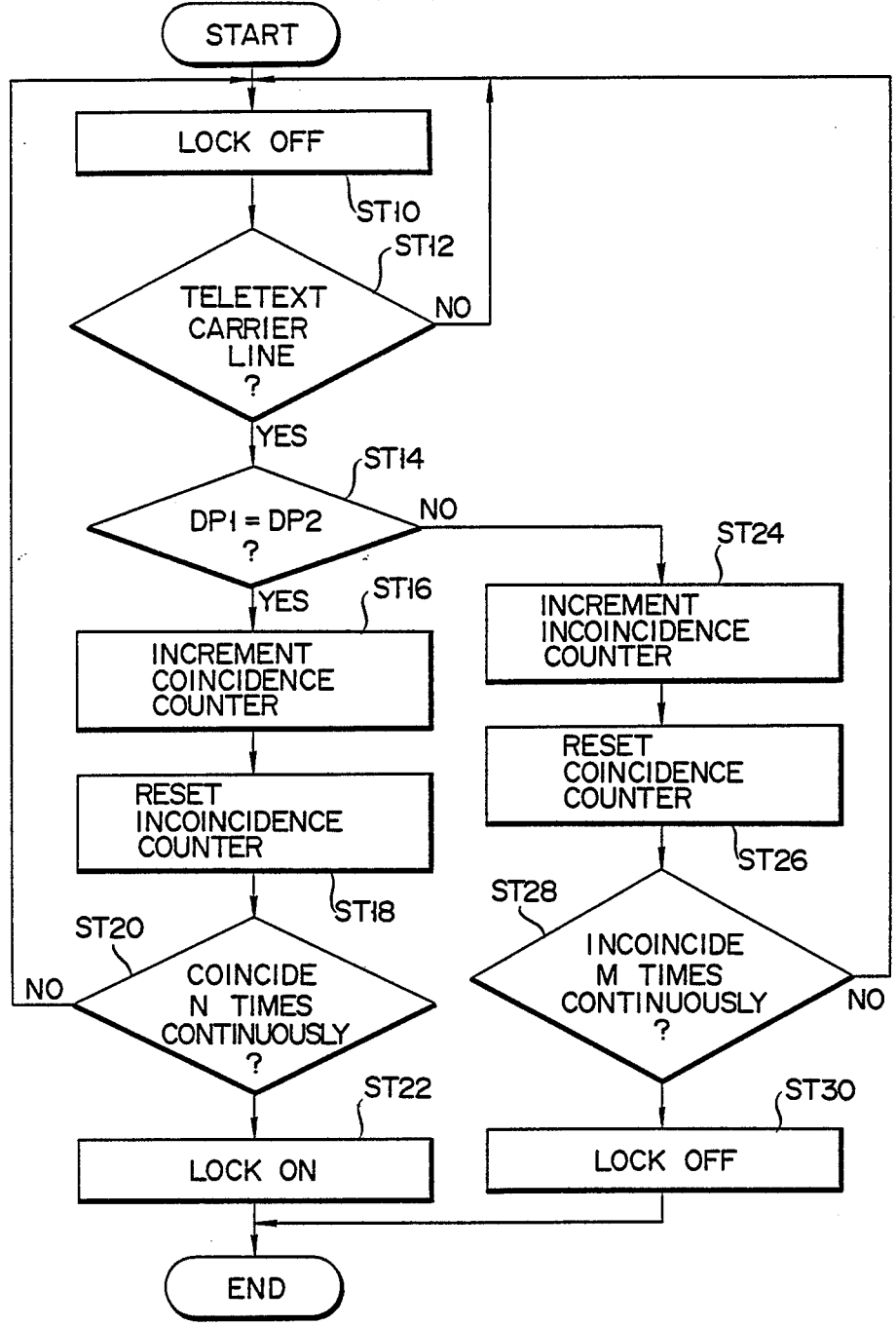
FIG. 5 is a flow chart in case when the second phase (DP2) of byte synchronization is obtained by software.

FIG. 5 is a flow chart showing the operation sequence of counter controller 104. During initialization (ST10), switches $163_1$ and $162_2$ are switched to their contact a sides so that counter $162_1$ is reset by detection phase DP1 to perform a pull-in operation. At the same time, detection phase DP1 is selected as frame (packet) synchronizing pulse E16 (this is called "lock off"). It is then checked if data fetched by sampling circuit 13 is on a teletext carrier line (ST12). If NO in step ST12, sampling circuit 13 fetches data (E12) until data on the teletext carrier line is detected. If YES in step ST12, it is checked if phases DP1 and DP2 coincide with each other (ST14). If YES in step ST14, the content of coincidence counter 102 connected to microcomputer 100 is incremented by one (ST16), and incoincidence counter 103 is reset (cleared) (ST18). If the incremented content of counter 102 does not reach predetermined value N (i.e., NO in step ST20), the loop of steps ST12 to ST20 is repeated. When the content of counter 102 has reached N (i.e., YES in step ST20), the switches are "locked on" (ST22). More specifically, when phases DP2 and DP1 continuously coincide with each other N times, signal E104 is generated from controller 104. Signal E105, which represents the logical AND of signals E104 and DS, is supplied from AND gate 105 to switches $163_1$ and $162_2$. Then, switches $163_1$ and $162_2$ select their contact b sides to output phase DP2 as frame synchronizing pulse E16, and to select phase DP2 as a self-reset pulse of counter $162_1$ (lock on; ST22).

However, if phases DP1 and DP2 do not coincide with each other (i.e., NO in step ST14), the content of counter 103 is incremented by one (ST24), and counter 102 is reset (cleared) (ST26). When the incremented content of counter 103 does not reach predetermined value M (which can be equal to or different from N) (i.e., NO in step ST28), the loop of steps ST12, ST14, and ST24 to ST28 is repeated. If the content of counter 103 is M (YES in step ST28), i.e., phases DP1 and DP2 continuously do not coincide with each other M times, switches $163_1$ and $162_2$ are locked off to their contact a sides (ST30), thus starting the pull-in operation.

As mentioned above, the selection control for phases DP1 and DP2 is performed by counter controller 104. However, when no color burst is detected by circuit 17, or if the continuity of the synchronization is not found, signal DS is not generated. Consequently, when no color burst is detected, phase DP1 is finally selected regardless of the selection by controller 104.

Now, other examples for detecting the continuity of the synchronization will be described. In these examples, in place of signal DS from detector, another signal DS from microcomputer 100 shown in FIG. 3 or 4 is used.

Referring to FIG. 4, H and V sync pulses separated from television broadcast signal RS (FIG. 1) are respectively supplied to the clock input of H sync stabilizer 40 and to the reset input of V counter 44. Pulse (8/5)fsc obtained from the VCO shown in FIG. 2 is supplied to the clock input of H counter 41. Counter 41 is reset by the output from stabilizer 40. Counter 44 is clocked by the output from stabilizer 40. The count output from counter 41 is converted to various H timing pulses by decoder 42, and the count output from counter 44 is converted to various V timing pulses by decoder 45.

The count output from H counter 41 is loaded to latch 43 in response to output DP1 from FC detector 161. The content of latch 43 is supplied to microcomputer 100 through bus 36. More specifically, if the content of latch 43 indicates a constant value for prescribed generation times (N times), microcomputer 100 generates signal DS to switch switches $163_1$ and $162_1$ to their contact b sides. In this case, the content of latch 43 is used for discriminating the continuity of byte synchronization (frame or packet synchronization). How this continuity of byte synchronization is determined will be described later with reference to FIG. 7.

Incidentally, there is another condition for detecting the synchronization continuity. Thus, conditions for determining synchronization discontinuity of the video signal are as follows.

Allowable value of period of V sync pulse: reference value±0.349 μs

Allowable value of period of H sync pulse: reference value±0.349 μs

Allowable value of color sub-carrier period: reference value±0.031 μs

When the above valves do not meet these conditions, it is regarded as discontinuity. The set values of these conditions are based on the facts:
  *the period of the V sync pulse is basically counted with reference to the H sync pulse;
  *the phase of H sync pulse has the allowable value of ±0.349 μs (2Tc) with respect to the superimposed position of the teletext signal; and
  *in terms of the phase error of the color sub-carrier, the allowable value ±0.031 μs is a future target value as an allowable value of variations in one horizontal scanning period in the NTSC scheme.

FIG. 6 is a flow chart when microcomputer 100 shown in FIG. 3 determines bit synchronization continuity of the teletext signal packet. When optimum phase P1 on an Nth horizontal scanning line (H line) is read out from optimum phase selector 34 shown in FIG. 3 (ST40), it is then checked in step ST42 whether the Nth line is the 10th or 21st line. If N=10 (YES in step ST42), N is incremented by one (ST 44), and optimum phase P1 on the 11th (=N) line is read out (ST40). Thereafter, the loop of steps ST40 to ST44 is repeated until N=21.

After read out of optimum phases P1 on the 10th to 21st H lines is completed (NO in step ST42), the optimum sampling phase for each H line is determined (ST46). Data indicating this sampling phase is loaded in latch 35 (FIG. 3) for each H line. It is then checked in step ST48 if the data for each lines is unchanged. If YES in step ST48, it is determined that bit synchronization is continuous, and signal DS is generated (ST50). Next, phase P2 is selected by selector 46, and the phase of sampling pulse SP is determined based on phase P2.

However, if NO in step ST48, it is determined that bit synchronization is discontinuous, and no signal DS is generated. In this case, phase P1 in FIG. 3 is selected by selector 46, and the phase of sampling pulse SP is thus determined.

Figure 7:
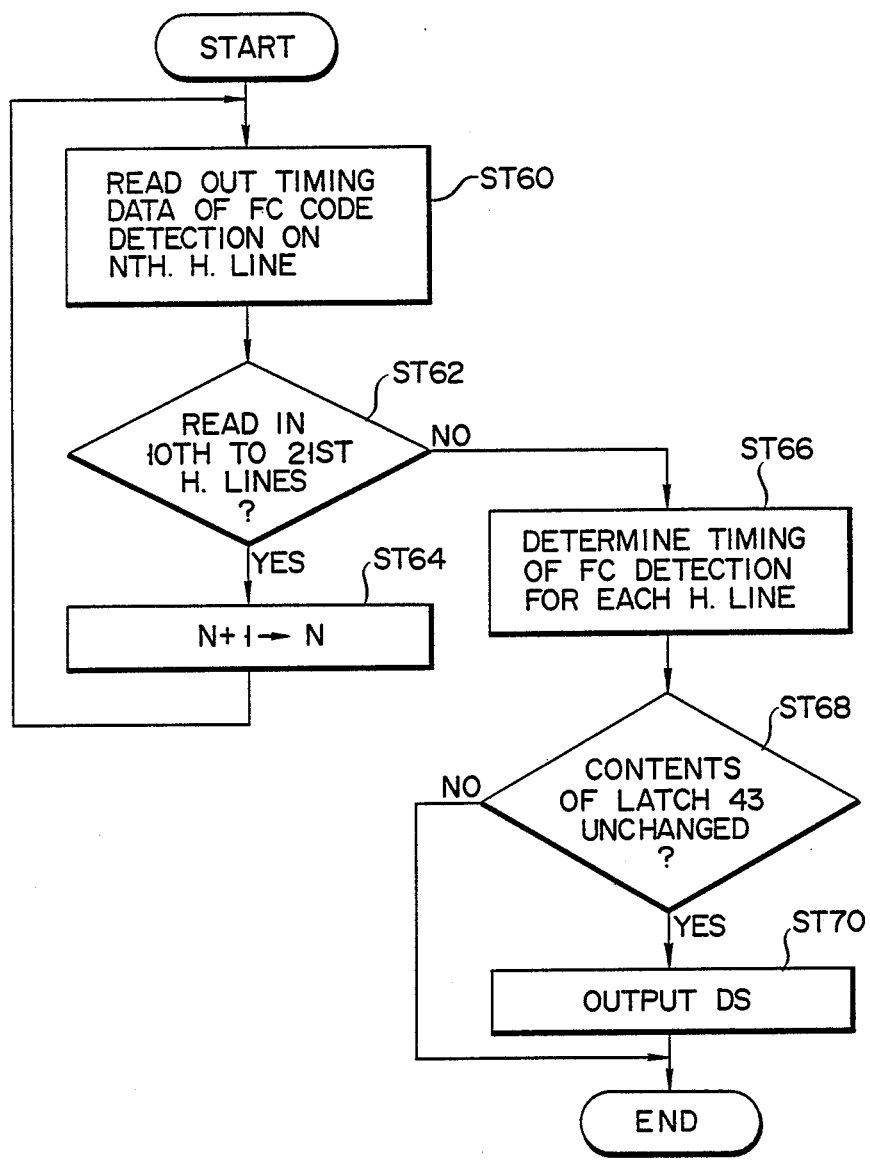
FIG. 7 is a flow chart when the presence/absence of byte synchronization continuity is discriminated by the arrangement shown in FIG. 4.

FIG. 7 is a flow chart when microcomputer 100 in FIG. 4 determines the byte synchronization continuity of the teletext signal packet. When framing code phase DP1 on the Nth horizontal scanning line (H line) is read out from FC detector 161 in FIG. 4 (step ST60), it is checked in step ST62 whether the Nth line is the 10th or 21st line. If N=10 (YES in step ST62), N is incremented by one (ST64), and phase DP1 on the 11th (=N) line is read out (ST60). Thereafter, the loop of steps ST60 to ST64 is repeated until N=21.

After phases DP1 are respectively read out for the 10th to 21st H lines (NO in step ST62), an FC detection timing for each H line is determined (ST66). Data indicating the timing for each H line is loaded in latch 43 in FIG. 4. It is then checked in step ST68 if the data for each H line is unchanged. If YES in step ST68, it is determined that byte synchronization is continuous, and signal DS is generated (ST70). Next, phase DP2 is selected by switch $163_1$ in FIG. 4, and the phase of packet synchronizing signal E16 is determined based thereon. If NO in step ST68, it is determined that byte synchronization is discontinuous, and no signal DS is generated. In this case, phase DP1 is selected by switch $163_1$ in FIG. 4, and byte synchronization (packet synchronization) is accomplished based on phase DP1.

In this embodiment, as described above, the first and second methods for determining the fetch phases of the teletext data (e.g., the sampling phase, the detection phase of the framing code, and the like) are adopted, and are alternatively used in accordance with the presence/absence of the color burst signal (i.e., the presence/absence of synchronization continuity). With this embodiment, the teletext data can be fetched to correspond with the transmission conditions (continuity or discontinuity) of the teletext signal packet. Therefore, data fetching errors can be greatly reduced when compared with a conventional apparatus adopting one of the first and second methods.

The present invention is not limited to the above embodiment, and various changes and modifications may be made within the spirit and scope of the invention.

For example, in the above embodiment, the present invention is applied to determination of both the sampling phase and the detection phase of the framing code. The present invention can be applied to either one of these determinations in accordance with the performance of the apparatus and its environmental conditions. When only the sampling phase is to be determined, circuit components 162 and 163 in FIG. 2 can be omitted (in this case, DP1 is supplied directly to buffer memory 15). When only the detection phase of the framing code is to be determined, circuit components 145 and 146 in FIG. 2 can be omitted (in this case, P1 is supplied directly to selector 147).

According to the present invention as described above, a sync apparatus for an image multiplex transmission system, which can eliminate data fetch errors regardless of the presence/absence of synchronization continuity, can be provided.

What is claimed is:

1. A sync apparatus for an image multiplex transmission system, comprising:

image information fetch means, responsive to a data packet contained in a transmission signal, for extracting the data packet from the transmission signal and fetching the contents of the data packet;

fetch phase determination means, coupled to said image information fetch means, for determining first phase data which defines the timing of fetching the contents of each said data packet, said fetching being performed in accordance with an actual phase of each said data packet by said image information fetch means;

continuity detection means, responsive to a specific signal component (color burst, data packet, etc.) of said transmission signal, for detecting the continuity of said specific signal component to provide a continuity detection signal; and fetch phase exchange means, coupled to said fetch phase determination means and to said continuity detection means, for exchanging said first phase data with second phase data when said continuity detection signal is provided, said second phase data being prefixed and free of said first phase data.

2. A sync apparatus according to claim 1, wherein the continuity of said specific signal component is detected when said specific signal component of said transmission signal is associated with a color burst of a color TV signal.

3. A sync apparatus according to claim 2, wherein said continuity detection means includes:
a color burst and continuity detector for detecting said color burst from said color TV signal, detecting the continuity of said data packet, and generating said continuity detection signal.

4. A sync apparatus according to claim 3, wherein said fetch phase determination means includes:
burst reproducing means for reproducing from said color TV signal a burst clock having a frequency of said color burst;
reference clock generator means for generating a reference clock being synchronized with said burst clock;
polyphase pulse generator means for generating a plurality of sampling clocks whose phases differ from one another; and
fetch phase selector means for selecting from said plural sampling clocks a first bit sync clock whose phase corresponds to said first phase data.

5. A sync apparatus according to claim 4, wherein said fetch phase determination means further includes:
sampling pulse selector means for selecting a specific sampling pulse from said plural sampling clocks in accordance with one of said first phase data and second phase data; and
framing code detector means for detecting from said data packet, in accordance with said specific sampling pulse, a first byte sync clock whose phase corresponds to said first phase data.

6. A sync apparatus according to claim 1, wherein the continuity of said specific signal component is detected when the contents of said specific signal component, obtained at a specific time, coincide with those obtained at another time.

7. A sync apparatus according to claim 6, wherein said continuity detection means includes:
comparator means for comparing the contents of said first phase data with those of said second phase data, generating a coincidence signal when the contents of said first phase data match those of said second phase data, and generating an incoincidence signal when the contents of said first phase data differ from those of said second phase data;

coincidence counter means for counting the number of said coincidence signal, and generating a lock on signal when the number of said coincidence signal reaches a first given number;

incoincidence counter means for counting the number of said incoincidence signal, and generating a lock off signal when the number of said coincidence signal reaches a second given number; and means for generating said continuity detection signal when said lock on signal appears while said lock off signal disappears.

8. A sync apparatus according to claim 6, wherein said continuity detection means includes:
bit sync latch means for latching the contents of said first phase data with respect to a plurality of said data packets; and
means for generating said continuity detection signal when the contents of said latched first phase data obtained from a specific data packet match those obtained from another data packet.

9. A sync apparatus according to claim 6, wherein said continuity detection means includes:
counter means for counting a given clock synchronized with the rate of transmission of said data packet, and generating a count output;
byte sync latch means for latching, with respect to a plurality of said data packets, the contents of said count output in accordance with the generation of said first phase data; and
circuit means for generating said continuity detection signal when the contents of said latched first phase data obtained from a specific data packet match those obtained from another data packet.

10. A sync apparatus according to claim 8, wherein said continuity detection means includes:
counter means for counting a given clock synchronized with the rate of transmission of said data packet, and generating a count output;
byte sync latch means for latching, with respect to a plurality of said data packets, the contents of said count output in accordance with the generation of said first phase data; and
circuit means for generating said continuity detection signal when the contents of said latched first phase data obtained from a specific data packet match those obtained from another data packet.

11. A sync apparatus for an image multiplex transmission system, comprising:
teletext data fetching means for separating a teletext signal packet from a television broadcast signal, and fetching teletext data contained in said packet which is included in a predetermined horizontal scanning period of said television broadcast signal;

first fetch phase determining means for determining a fetch phase of the teletext data in said teletext data fetching means for each teletext signal packet in accordance with the phase thereof;

second fetch phase determining means for, when incoincidence or coincidence between the fetch phase of the teletext data held in advance and the phase of each teletext signal packet is continuously found a predetermined number of times, starting and stopping a pull-in operation for locking the held phase with the phase of said packet;

signal detecting means for detecting a color burst signal included in the television broadcast signal and detecting a continuity of said teletext signal packet; and fetch phase selecting means for selecting, as a fetch phase for said teletext data fetching means, the fetch phase determined by said second fetch phase determining means when the color burst signal and the continuity of said teletext signal packet are detected by said signal detecting means, and for selecting, as a fetch phase for said teletext data fetching means, the fetch phase determined by said first fetch phase determining means when the color burst signal and the continuity of said teletext signal packet phase are not detected.

* * * * *